Sept. 23, 1969 J. F. CLINE 3,468,456
CONVEYING MEANS FOR DELIVERING MATERIAL
AT A SUBSTANTIALLY CONSTANT RATE
Filed May 19, 1967 2 Sheets-Sheet 1

INVENTOR;
JEROME F. CLINE,
BY
David Young
ATTORNEY.

Sept. 23, 1969  J. F. CLINE  3,468,456
CONVEYING MEANS FOR DELIVERING MATERIAL
AT A SUBSTANTIALLY CONSTANT RATE
Filed May 19, 1967  2 Sheets-Sheet 2

INVENTOR;
JEROME F. CLINE,
BY
David Young
ATTORNEY.

3,468,456
Patented Sept. 23, 1969

---

3,468,456
CONVEYING MEANS FOR DELIVERING MATERIAL AT A SUBSTANTIALLY CONSTANT RATE
Jerome F. Cline, Columbus, Ohio, assignor to Jeffrey Galion Manufacturing Company, a corporation of Ohio
Filed May 19, 1967, Ser. No. 639,811
Int. Cl. B67d 5/08
U.S. Cl. 222—55                                    4 Claims

ABSTRACT OF THE DISCLOSURE

A first conveying means feeds material to a second conveying means. The first conveying means is adjustable in order to vary the rate of feed of material from the first conveying means to the second conveying means, and the latter is yieldable in response to the load of material. The second conveying means is connected to a load responsive element, which modifies a control signal to the first conveying means, thereby to control and adjust the rate of feed of material in order to maintain the rate of feed substantially constant.

---

Figure 1:
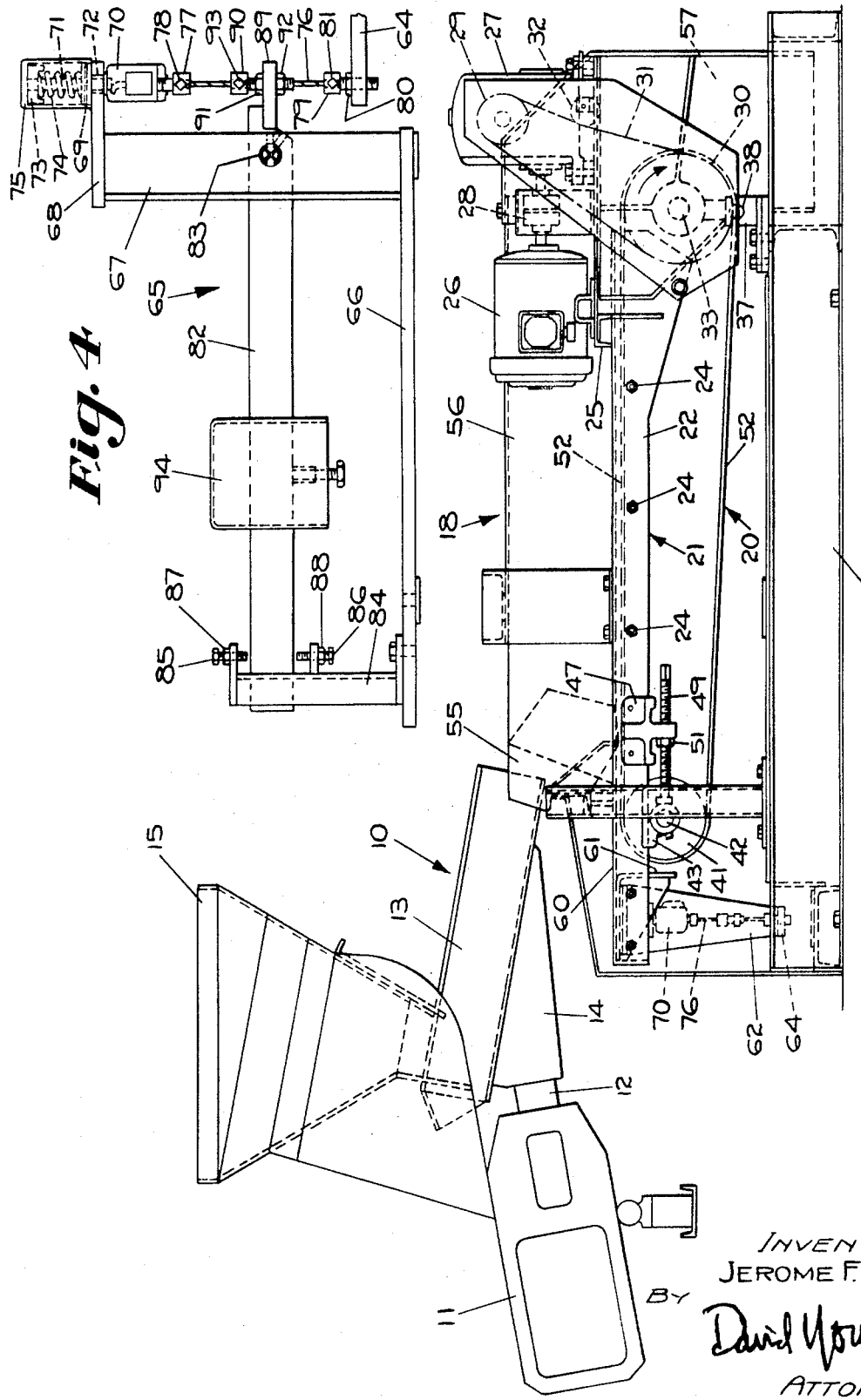

The instant invention relates to conveying means for delivering material at a substantially constant rate, in which the rate at which the material is being delivered is continuously measured or weighed, in order to make adjustment for any variation in the rate of delivery of the material, thereby to maintain the delivery of the material at a substantially constant rate.

There are many operations and processes which require that materials be combined on a continuous basis and according to preselected proportions of such materials. These processes and operations require that the materials be fed continuously, and that each material be delivered at a substantially constant rate of feed in order to maintain the required proportions of the respective materials. For this purpose, conveying equipment is utilized to continuously feed the material. Such conveying equipment may include a first conveying means which feeds the material from a source, and is capable of being controlled to vary the rate at which the material is delivered by the first conveying means. A second conveying means receives the material from the first conveying means and continues the movement of the material.

The second conveying means includes measuring or weighing means by which the rate of delivery of material from the first conveying means and over the second conveying means may be determined. Such determination of the rate of delivery of the material is converted to a signal by which the first conveying means is controlled. Thus, if there is a variation in the rate of delivery of the material, such variation is picked up in the second conveying means and manifests itself as a control signal which is referred to the first conveying means, and in turn controls the speed of operation of the first conveying means, thereby to make the necessary adjustment on the first conveying means so as to maintain the delivery of the material at a substantially constant rate.

In order to maintain the delivery of the material at a substantially constant rate, it is required that the conveying equipment operate with a high degree of accuracy and reliability. This type of equipment is expected to operate with little or no attention during extended periods of time. The conditions under which the equipment is operated may be such as to adversely affect the operation of the equipment, for example, where such equipment is operating in a dusty atmosphere, or is subjected to extremes of temperature. Nevertheless it is expected that the equipment operate accurately and reliably to maintain the delivery of the material at a substantially constant rate in accordance with predetermined and selected quantities for the particular operation or process.

Accordingly, it is an object of this invention to provide an improved conveying means for delivering material at a substantially constant rate which is capable of operating with a high degree of accuracy and reliability. The material is fed over a conveying means which is responsive to the load of such material. Any variation in the load of material is converted to a signal which is referred back to the control of the first conveying means to make an adjustment of the speed of operation of the first conveying means, thereby to maintain the rate of delivery of the material at a substantially constant rate.

The load of the material on the second conveying means is communicated to a load responsive element, such as a load cell by which the control signal to the first conveying means may be adjusted in order to accurately reflect the load of material on the second conveying means. The second conveying means is connected to the load responsive element by a tension connection so that it is a tension force which is applied from the second conveying means to the load responsive element. In a conveying means constructed in accordance with this invention the drifting of the control signal is eliminated. Such drifting of the control signal produced inaccuracies in the operation of the first conveying means, since the control signal applied to the first conveying means would not accurately reflect the rate of conveying the material on the second conveying means. There is also a damping, with respect to the load responsive element, of the vibration forces in the system which emanate from the moving parts of the conveying means. Such damping also improves the accuracy and reliability of the signal which is transmitted to the first conveying means for controlling the rate of feed of the material.

Other objects of the invention will appear hereinafter, the novel features and combinations being set forth in the appended claims.

Figure 2:
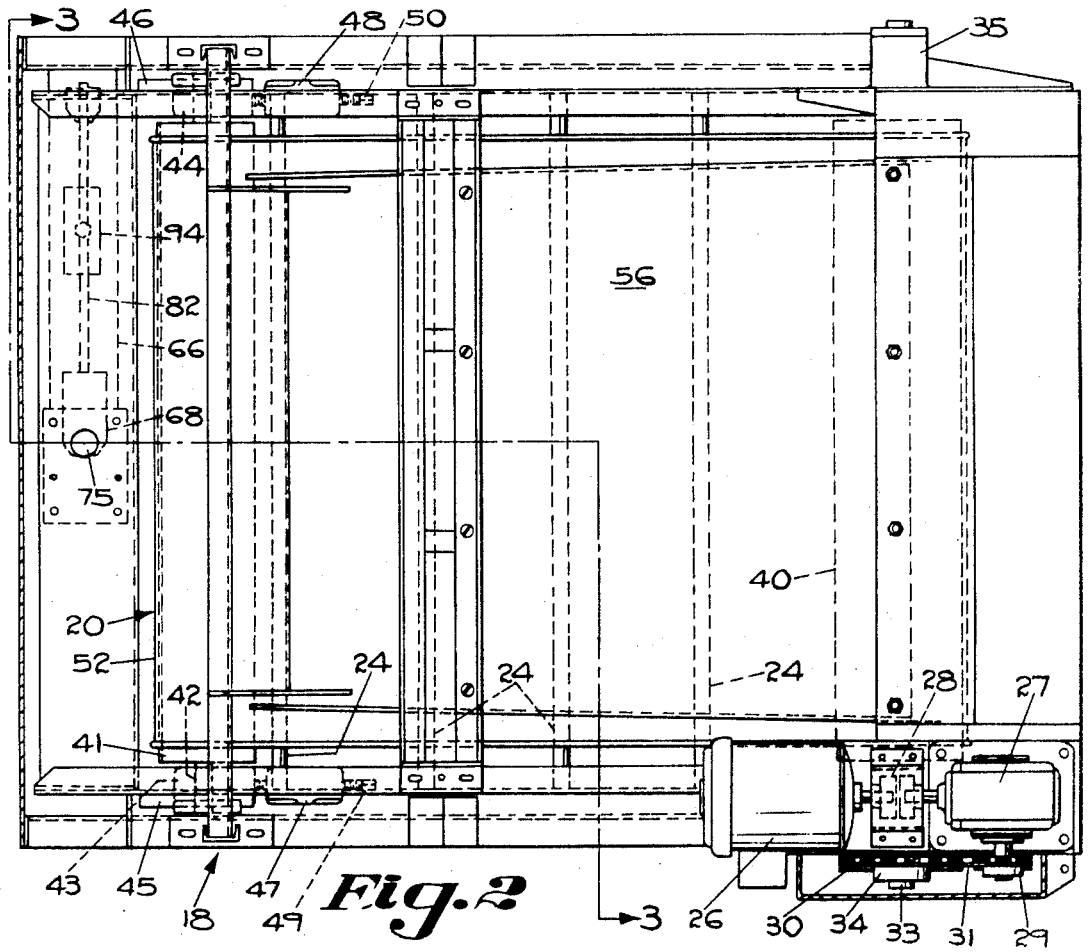
Figure 3:
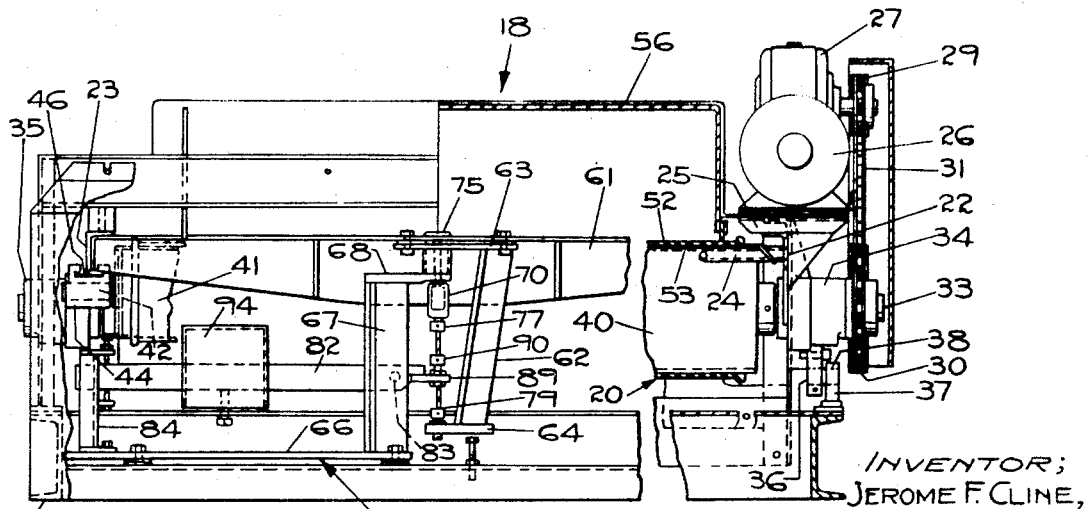

In the drawings:
FIG. 1 is a side elevational view of the constant rate conveying equipment, constructed in accordance with this invention;
FIG. 2 is a top plan view of the conveying equipment shown in FIG. 1, with the first conveying means removed;
FIG. 3 in an end elevational view of the conveying equipment, partially in section, on line 3—3 in FIG. 2; and
FIG. 4 is an elevational view of the tare lever and load pick up subassembly.

Referring to the drawings, in particular FIG. 1, there is illustrated the conveying equipment for feeding material at a substantially constant rate. Such conveying equipment has a first conveying means which may be an electric vibrating feeder 10, which has a stator or main frame 11 and an armature 12 which is vibrated with a reciprocatory motion relatively to the stator 11. The armature 12 is connected to the feeder deck 13 by means of a subframe 14 at the underside of the deck 13. A hopper 15 is disposed above the feeder deck 13. The material is placed in the hopper 15 and discharges by gravity onto the deck 13 of the vibrating feeder 10, by which the material is fed.

The electric vibrating feeder 10 may be controlled as to the rate of feed of material on the deck 13. Such control is achieved by variation of the magnitude of the current that is applied to the electric vibrating feeder 10, which in turn controls the stroke of the armature 12. The rate of feed of material on the deck 13 is proportional to the stroke of the armature 12, which is applied to the deck 13 through the subframe 14.

A second conveying means, which is a weighing conveyor 18, is arranged in succession with the electric vibrating feeder 10 to receive the material from the deck 13. The weighing conveyor 18 performs a measuring or weighing function with respect to the material which it receives from the deck 13 of the electric vibrating feeder 10. The rate of feed of the material from the feeder 10 and over the weighing conveyor 18 is substantially constant during operation of the equipment. If there should be any variation in the rate of feed, then an adjustment is called for in the rate of feed of material by the vibrating feeder 10, so as to adjust the rate of feed of material to the desired rate, and thereby to maintain the overall feeding of the material at the substantially constant predetermined rate.

Referring to FIGS. 1, 2 and 3, the weighing conveyor 18 has a main frame 19, which may be constructed of conventional structural elements, such as structural channels which are cut to size and assembled, as by welding.

An endless belt conveyor 20 is supported on the main frame 19. The belt conveyor 20 has a supporting frame 21 which is formed of opposite side frame members 22, 23, which are laterally spaced and are joined by a plurality of lateral tie rods 24. At one end of the supporting frame 21, which is the discharge end of the weighing conveyor 18, and is at the right in FIG. 1, there is a platform 25 which is secured to the side frame member 22. A motor 26 is mounted on the platform 25 and is connected to a speed reducer 27 by a coupling 28. The speed reducer 27 is driven by the motor 26 and in turn drives a sprocket 29 which is connected to a driven sprocket 30 by a drive chain 31 to drive the driven sprocket 30. There is an adjustable cam 32 by which the chain 31 may be tightened to adjust the tension in the chain 31.

The driven sprocket 30 is on a shaft 33 which is rotatably supported in opposite bearings 34, 35, which are secured to the conveyor supporting frame 21. Each of the bearings 34, 35 has a depending leg 36, as best seen in FIG. 3. At each side of the main frame 19 and adjacent to each depending leg 36 there is a pivot stand 37. A pivot 38, which may be of the flexural type, is secured to the depending leg 36 and the adjacent pivot stand 37 to pivotally connect these elements, and in effect then, there is a yieldable support of the supporting frame 21 and the weighing conveyor 18 on the main frame 19, by which the weighing conveyor 18 can move relatively to the main frame 19.

A drive pulley 40 is secured to the shaft 33 between the side frame members 22, 23. The shaft 33 is rotated by the driven sprocket 30, and in turn rotates the drive pulley 40.

At the other end of the weighing conveyor 18, which is the material receiving end thereof, at the left, as viewed in FIG. 1, there is a take-up pulley 41 secured to a shaft 42 between the side frame members 22, 23. The shaft 42 is rotatably supported by oppositely disposed bearings 43, 44, which are slidably supported on the side frame members 22, 23 by slide plates 45, 46, respectively. There is a take-up bracket 47 for the bearing 43, and a similar take-up bracket 48 for the bearing 44. A take-up screw 49 is threaded through the take-up bracket 47 to adjust the position of the bearing 43, and similarly, a screw 50 is threaded through the take-up bracket 48 to adjust the position of the bearing 44. A nut 51 on each of the adjusting screws 49, 50 locks the latter in adjusted positions. This adjusts the position of the take-up pulley 41. The endless belt conveyor 20 has an endless conveyor belt 52 which extends around the drive pulley 30 and the take-up pulley 41, and the tension in the belt 52 is adjusted by adjustment of the take-up pulley 41. There is a supporting plate 53 below the conveying run of the conveyor belt 52 to support the latter. The supporting plate 53 is disposed between the side frame members 23 on the lateral tie rods 24.

The material from the electric vibrating feeder 10 discharges into a load chute 55 and thence onto the conveyor belt 52 of the belt conveyor 20. A hood 56 covers the belt conveyor 20 from the load chute to the discharge chute 57 at the right end of the conveyor 20, as viewed in FIG. 1.

The supporting frame 21 of the conveyor 20 is pivotally mounted on the main frame 19 by the opposite pivots 38. Therefore, the conveyor 20 is responsive to the load of material which is being conveyed on the conveyor belt 52, and the conveyor 20 will yield to a greater or lesser extent, depending on the magnitude of the load of material.

The supporting frame 21 extends longitudinally of the conveyor 20, and there is a longitudinal extension 60 of the supporting frame 21 which is formed by an extension of the side frame members 22, 23 beyond the take-up pulley 41. The frame extension 60 includes a cross beam 61 which extends between the side frame members 22, 23 and is secured to the latter by bolts or other suitable means. A load hanger bracket 62 is formed with a top plate 63, by which it is secured to the cross beam 61 with a plurality of bolts, or the like. A lateral foot 64 is secured to the lower end of the load hanger bracket 62.

There is a tare lever and load pick-up sub-assembly 65, as illustrated in FIG. 4, which is mounted on the main frame 19 and secured to the latter by a plurality of bolts, or the like. Such sub-assembly 65 has a base member or plate 66 and an upright post 67 that is secured to one end of the base member 66. A platform 68 is secured to the upper end of the upright post 67 and extends laterally to a position in which it overlies or is in upright alignment with the lateral foot 64 of the load hanger bracket 62, as seen in FIGS. 3 and 4. The lateral foot 64 of the load hanger bracket 62 is positioned near the lower end of the upright post 67.

A load cell 70 is secured to a rod 71 which extends upwardly through an aperture 72 in the platform 68. A piston 73 is secured to the upper end of the rod 71, and a compression spring 74 is interposed between the piston 73 and end cap 69 of the cover 75 on the platform 68. The cover 75 encloses the rod 71, the piston 73 and the compression spring 74. The rod 71 is extended above the platform 68 by the compression spring 74 to its limit position, which is determined by abutment of the piston 73 against the inside of the cover 75. This fixes the position of the load cell 70 below the platform 68.

The load hanger bracket 62 is connected to the load cell 70 by a tension element which is a flexible cable 76 that is secured to the load cell 70 and to the foot 64. The load cell 70 has an adaptor 77 which receives the upper end of the flexible cable 76, and there is a set screw 78 by which the flexible cable 76 is secured in the adaptor 77. At the foot 64 there is a load adjusting screw 79 which is threaded into the foot 64 and is fixed in position by a nut 80. The load adjusting screw 79 receives the lower end of the flexible cable 76, and the latter is secured to the load adjusting screw 79 by a set screw 81. When the conveyor 20 is loaded by material on the conveyor belt 52, the force of such loading is transmitted through the supporting frame 21 and the load hanger bracket 62 to the foot 64, and thence through the tension cable 76 to the load cell 70, such force of the load being applied to the load cell 70 in tension.

The sub-assembly 65 includes a tare weight lever 82 which is pivotally mounted on the upright post 67 on a pivot 83, which may be a flexural pivot, and is disposed at a position intermediate the upper and lower ends of the post 67. The tare weight lever 82 extends from the upright post 67 in the same direction as the base member 66 to the end of the latter opposite the upright post 67. There is a tare weight lever limit stand 84 at the end of the base member 66. The tare weight lever 82 extends into the limit stand 84 between an upper limit screw 85 and a lower limit screw 86. The limit screws 85, 86 are adjustable and are secured in adjusted position by the nut 87, 88, respectively. The movement of the tare weight lever 82 on the pivot 83 is limited by the opposite limit screws 85, 86.

The inner end of the tare weight lever 82 has an arm 89 in which there is a tare lever adjusting screw 90 which is secured to the arm 89 in selected position by opposite nut 91, 92. The flexible cable 76 passes through the tare lever adjusting screw 90 and is fixedly secured to the latter by a set screw 93 which is threaded through the adjusting screw 90 into engagement with the flexible cable 76. On the opposite side of the upright post 67 there is a tare weight 94 which is adjustable on the tare weight lever 82 to a position in which it substantially counterbalances the static load of the endless belt conveyor 20. In practice, it is preferred to counterbalance approximately ninety-five percent of the static weight of the endless belt conveyor 20, and the remaining approximately five percent of the static weight of the endless belt conveyor 20 is then applied to the load cell 70, which has the effect of preloading the load cell 70. The preloading is ultimately canceled out for operative purposes by calibration. The force of the tare weight 94 is applied through the tare weight lever 82 to the flexible cable 76 to the load hanger bracket 62, to counterbalance the belt conveyor 20.

In operation, the electric vibrating feeder 10 feeds the material from the hopper 15 onto the endless belt conveyor 20. The load of material that is thus applied to the conveyor 20 causes the latter and the supporting frame 21 to yield or pivot about the pivots 38. The load hanger bracket 62 is movable with the supporting frame 21 in response to the load of material on the conveyor 20, and applies a tension force to the flexible cable 76, which transmits the force of the load of material to the load cell 70. There is the usual operating and control circuit for the electric vibrating feeder 10, in which the rate of feed of the feeder 10 is controlled by adjustment of the current which is applied to the feeder, which in turn controls the stroke of the feeder. The load cell 70 is connected into the operating and control circuit of the electric vibrating feeder, which may be done in the customary manner.

The load cell 70 is responsive to the force which is applied to it through the flexible cable 76, and is operative in the operating and control circuit of the electric vibrating feeder 10 to control the operation of the latter and to vary the rate of feed of the material. Thus, if there is any variation in the load of material on the endless belt conveyor 20, such variation is transmitted to the load cell as a variation of the force applied to the load cell 70 through the flexible cable 76, and the load cell 70 in turn effects a modification of the control signal to the electric vibrating feeder 10 to change the rate of feed of material from the feeder 10 and to restore the rate of delivery of material on the endless belt conveyor 20 thereby to maintain the rate of feed of material substantially constant.

Having thus described and shown an embodiment of the invention, what it is desired to secure by Letters Patent of the United States is:

1. Material conveying means for delivering material at a substantially constant rate comprising a first conveying means, a second conveying means, said first conveying means and said second conveying means being arranged in succession for the delivery of material from the first conveying means to the second conveying means, said second conveying means comprising a supporting frame, a yieldable mounting for said supporting frame to yieldably support the supporting frame and said second conveying means in order to be movable by the load of material and to be responsive to the load of material that is conveyed on the second conveying means, a load responsive element to provide a signal that is proportional to the load that is applied to the load responsive element, tension means to connect said supporting frame to said load responsive element to transmit the force of the load of material that is being conveyed by said second conveying means to the load responsive element thereby to provide a control signal that is proportional to such load of material for controlling the rate of delivery of material from said first conveyor in order to maintain a constant rate of delivery of material, said supporting frame extending longitudinally along said second conveying means, said yieldable mounting for said supporting frame comprising pivot means that is disposed at one end of the supporting frame, a longitudinal extension of said supporting frame at the other end thereof, means to connect said tension means to said longitudinal extension of said supporting frame to transmit the force of the load of material on said second conveying means to said load responsive element, said load responsive element comprises a load cell, and including a load cell sub-assembly comprising a base member, an upright post at one end of said base member, said load cell being secured to said upright post at the upper end thereof, a load hanger secured to said longitudinal extension of said supporting frame in depending position to adjacent the lower end of said upright post, said tension means being secured to said load hanger and to said load cell to transmit the force of said load to the load cell, a tare weight lever, pivot means mounting said tare weight lever on said upright post intermediate the upper end and the lower end thereof, means to secure said tare weight lever to said tension means, said tare weight lever extending from said upright post longitudinally in the direction of said base member, a tare weight on said tare weight lever, means to adjust the position of said tare weight in order to counterbalance the static weight of said second conveying means, said means to secure said load cell to said upright post includes yieldable means between the upright post and the load cell which is yieldable in response to an overloading force on the load cell thereby to protect the load cell.

2. Material conveying means for delivering material at a substantially constant rate as recited in claim 1 in which said yieldable means comprises a compression spring which is compressed by an overloading force on the load cell.

3. Material conveying means for delivering material at a substantially constant rate comprising a first conveying means, a second conveying means, said first conveying means and said second conveying means being arranged in succession for the delivery of material from the first conveying means to the second conveying means, said second conveying means comprising a supporting frame, a yieldable mounting for said supporting frame to yieldably support the supporting frame and said second conveying means in order to be movable by the load of material and to be responsive to the load of material that is conveyed on the second conveying means, a load responsive element to provide a signal that is proportional to the load that is applied to the load responsive element, tension means to connect said supporting frame to said load responsive element to transmit the force of the load of material that is being conveyed by said second conveying means to the load responsive element thereby to provide a control signal that is proportional to such load of material for controlling the rate of delivery of material from said first conveyor in order to maintain a constant rate of delivery of material, means to secure said load responsive element to a fixed support including yieldable means between the fixed support and the load responsive element which is yieldable in response to an overloading force on the load responsive element thereby to protect the load responsive element.

4. Material conveying means for delivering material at a substantially constant rate as recited in claim 3 in which said yieldable means comprises a compression spring which is compressed by an overloading force on the load responsive element.

References Cited

UNITED STATES PATENTS

| | | | |
|---|---|---|---|
| 2,276,383 | 3/1942 | Francis | 222—55 |
| 2,857,126 | 10/1958 | Deegan | 177—120 |
| 2,889,030 | 6/1959 | Mottet | 198—39 |
| 3,062,408 | 11/1962 | Boudan | 222—55 |
| 3,190,381 | 6/1965 | Eberhardt et al. | 198—39 X |

FOREIGN PATENTS 158,731   4/1957   Sweden.

ROBERT B. REEVES, Primary Examiner

H. S. LANE, Assistant Examiner

U.S. Cl. X.R.

222—76